Feb. 4, 1964 D. T. AYERS, JR 3,120,156
VEHICLE BRAKE MECHANISM WITH PEDAL
LEVERAGE CHANGING MEANS
Filed Sept. 6, 1962 3 Sheets-Sheet 1

INVENTOR
DAVID T. AYERS JR.

BY John K. Phillips
ATTORNEY

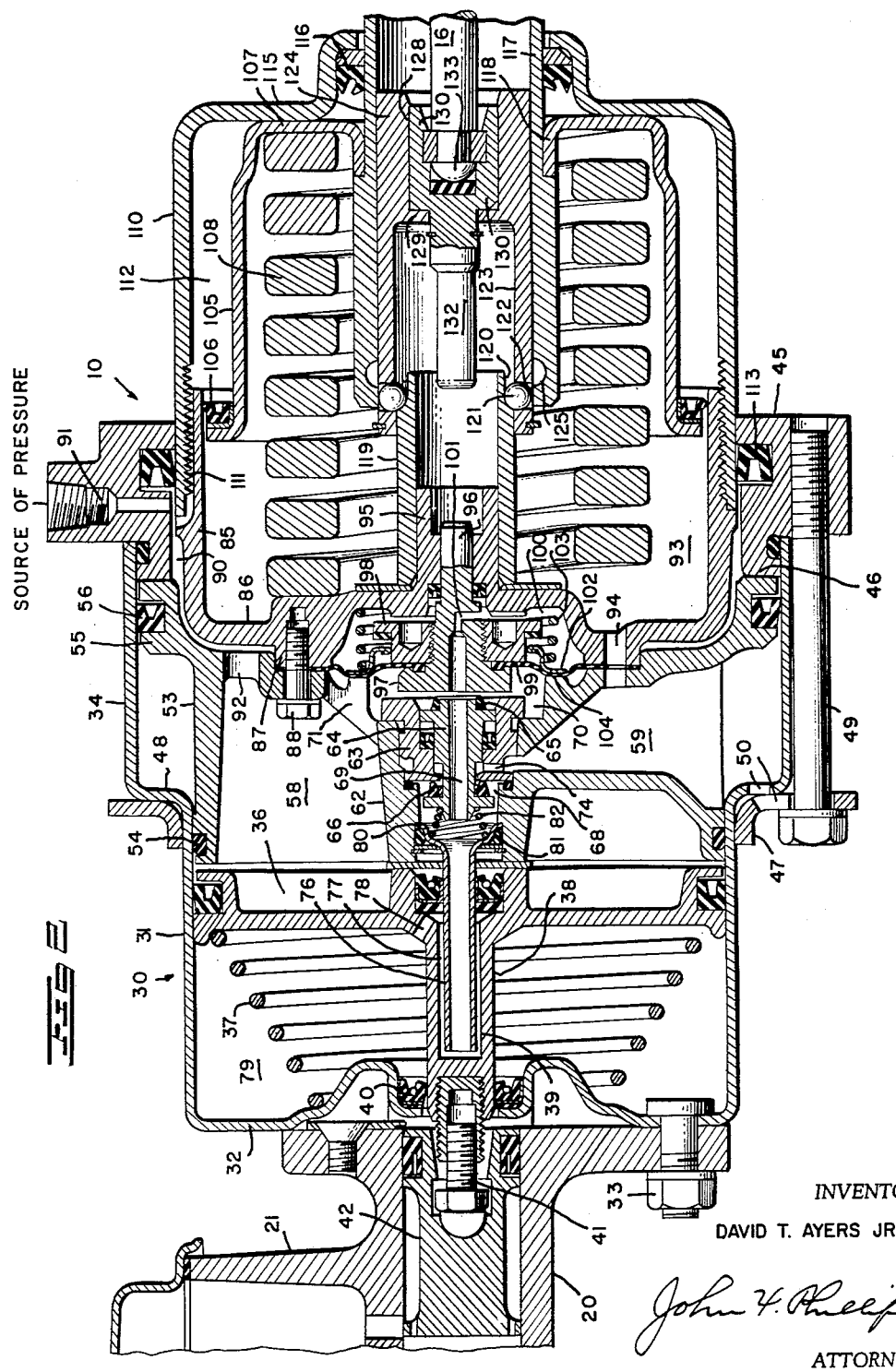

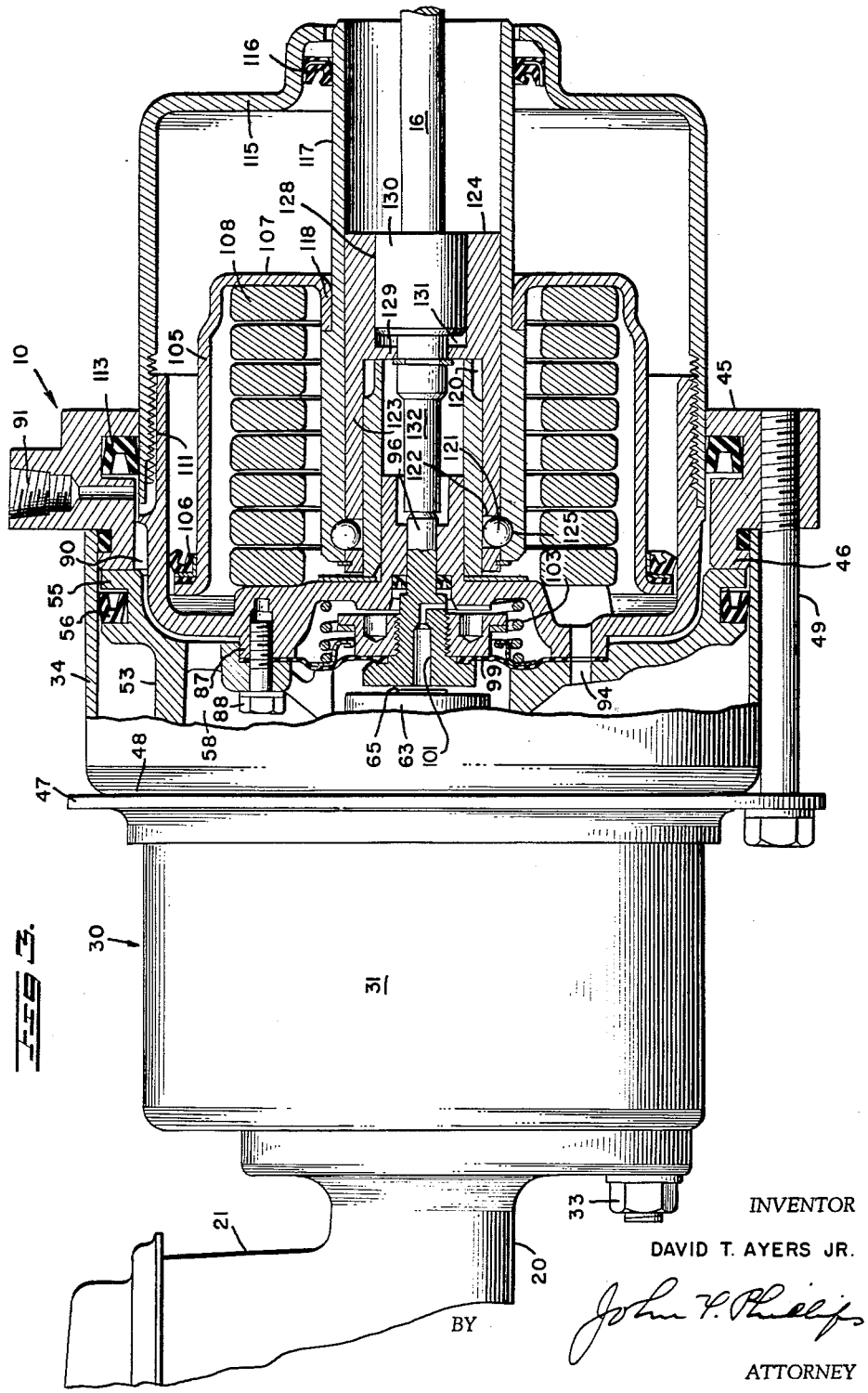

United States Patent Office

3,120,156
Patented Feb. 4, 1964

3,120,156
VEHICLE BRAKE MECHANISM WITH PEDAL
LEVERAGE CHANGING MEANS
David T. Ayers, Jr., Birmingham, Mich., assignor to
Kelsey-Hayes Company, Romulus, Mich., a corporation
of Delaware
Filed Sept. 6, 1962, Ser. No. 221,851
15 Claims. (Cl. 91—391)

This invention relates to vehicle brake mechanism and is an improvement over the structure shown in my copending application, Serial No. 181,409, filed March 21, 1962.

It has been proposed to provide vehicle brakes which are fully power-operated as distinguished from booster brakes in which part of the work is performed by the operator and part by a fluid pressure motor. In such case, the pedal partakes of substantial travel, shorter than the travel of a conventional manually-operated brake. In a full power-operated brake, the pedal partakes of only a fraction of an inch of travel in order for the valving for the motor to be operated, it being unnecessary for the pedal to follow through and perform part of the work.

The brake pedal of a power-operated brake mechanism may be arranged quite close to the vehicle toe board because of the very slight movement of the brake pedal necessary in normal operation. However, in the event of a failure of pressure in the source for the brake-motor, the pedal travel is insufficient for foot-operation of the brakes.

It has therefore been proposed to provide means automatically operative when pressure in the source fails for moving the brake pedal to a higher position and establishing mechanical connection between the pedal and the master cylinder plunger for the pedal-operation of the brakes. This is highly advantageous over the pedal-operation of booster mechanisms, since it provides a much higher lever ratio for operating the brakes upon a failure in pressure than is available in booster brake mechanisms. A pedal control system of the type referred to wherein the brake pedal is raised to a higher position for foot-operation of the brakes is shown in my copending application referred to.

An important object of the present invention is to provide an improved mechanism, wherein a spring is maintained compressed by pressure in the source and is released upon a failure of such pressure to raise the pedal to a higher position from which it is movable for the foot operation of the brakes.

A further object is to provide such a mechanism wherein certain parts are locked together in association with the spring referred to when pressure is present in the source and wherein, upon a failure in such pressure, the pedal is raised and the locking means establishes a mechanical connection between two elements through which foot-applied pedal forces may be transmitted to the master cylinder plunger to effect foot-operation of the brakes.

A further object is to provide a mechanism of the character referred to in which a pedal-operable push rod normally engages a part of the valve mechanism for the operation of the latter immediately upon movement of the brake pedal, and wherein a lost motion connection is provided between the push rod and manually operable elements which function upon a power failure, and wherein the push rod is moved substantially away from the valve mechanism and the lost motion referred to is taken up when pressure in the source fails, whereby the brakes may be foot-operated.

Other objects and advantages of the invention will become apparent during the course of the following description.

In the drawings, I have shown one embodiment of the invention.

In this showing:

FIGURE 2 is an enlarged axial sectional view through the motor mechanism and associated parts, and FIGURE 3 is a similar view, the motor being shown in elevation.

Figure 1:
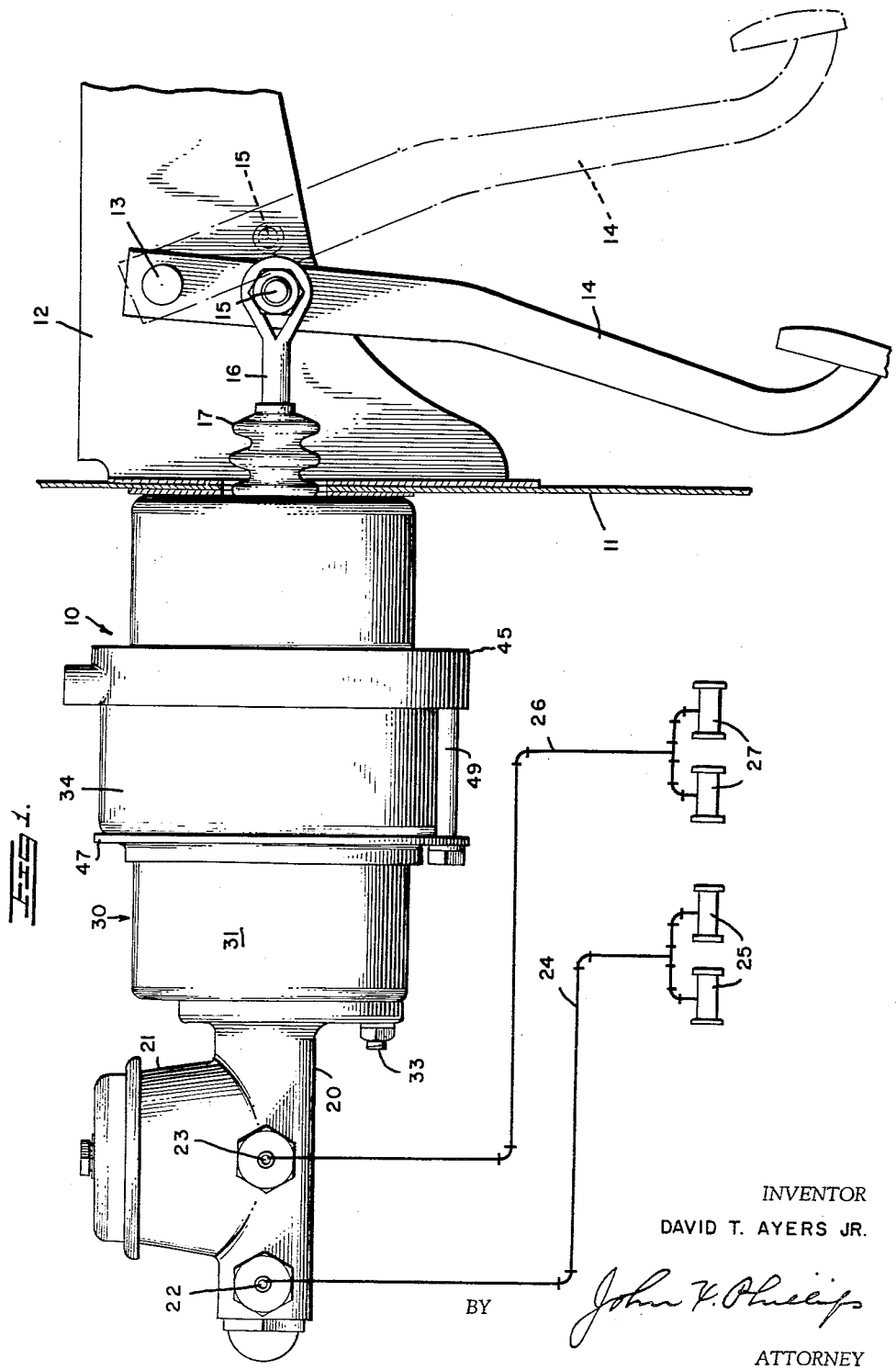
FIGURE 1 is a side elevation of the brake operating mechanism showing its connection with the brake pedal, the wheel cylinders and their connection with the master cylinder being diagrammatically represented.

Referring to FIGURE 1, the mechanism forming the subject matter of the present invention, including the fluid pressure motor, is indicated as a whole with the numeral 10. The mechanism 10 is supported in any suitable manner with respect to the fire wall 11 of the vehicle, which fire wall carries a rearwardly extended bracket 12 pivotally supporting as at 13 a depending brake pedal 14 of conventional type. The brake pedal is connected as at 15 to a push rod 16, sealed with the usual boot 17, for operating the motor valve mechanism to be described.

Mechanism 10 is provided at the end remote from the fire wall 11 with a master cylinder 20 having the usual reservoir 21. The master cylinder may be of the dual chamber type for separately supplying hydraulic fluid to the front and rear wheel cylinders. Since such master cylinder forms no part of the present invention, it has not been illustrated except that in FIGURE 1 it has been shown with separate front and rear fluid outlets 22 and 23. The outlet 22 is connected by a fluid line 24 to the front wheel cylinders 25. The outlet 23 is similarly connected by a fluid line 26 to the rear wheel cylinders 27. It will become apparent that the brake pedal normally occupies the solid line position shown in FIGURE 1 from which it is movable a slight distance for the operation of the wheel cylinders 25 and 27. Upon a failure in the source of pressure for the brake-operating motor, the pedal 14 will be raised to the broken line position shown in FIGURE 1, from which position it is foot-operable to apply the brakes with substantially the same leverage as is present in conventional foot-operated brake mechanisms.

Referring to FIGURE 2 the structure 10 includes a motor 30 which comprises a cylindrical casing 31 having an end wall 32 to which the master cylinder 20 is fixed as at 33. The casing 31 has its rear end enlarged as at 34 for a purpose which will become apparent.

Within the motor is arranged a pressure responsive unit shown in the form of a piston 36 biased to its off-position by a return spring 37. The piston 36 is provided with a forwardly extending axial portion 38 having a bore 39 therein for a purpose to be described. The forward wall 32 of the motor carries a seal 40 in which the extension 38 is slidable, and this extension is suitably connected as at 41 to the adjacent master cylinder plunger 42.

The rear end of the enlargement 34 is closed by a ring 45 projecting into the enlargement 34 and forming a shoulder 46 for a purpose to be described. A clamping ring 47 surrounds the motor casing and engages against the shoulder 48 formed between the casing portions 31 and 34. A screw 49 passes through the flange 47 and is threaded in the ring 45 to clamp the latter relative to the motor casing. The shoulder 48 and flange or ring 47 are ported as at 50 for a purpose to be described.

Within the motor casing is arranged a force transmitting member 53, the forward end of which is sealed as at 54 for sliding movement under conditions to be described in the casing portion 31. The rear end of the member 53 is provided with an annular flange 55 sealed as at 56 for sliding movement in the casing portion 34. The rear face of the flange 55 normally seats against the shoulder 46. The member 53 defines with the piston 36 a chamber 58 which is always subject to super-atmospheric pressure in a manner to be described. The member 53 has cast therein a passage 59, closed to the chamber 58 and open to the atmosphere through the ports 50.

The member 53 is provided with a hub portion 62 in the rear end of which is seated a plug 63. A valve device 64 is slidable in the plug 63 and is provided at its rear end with a valve element 65 for a purpose to be described. The forward end portion of the valve device 64 is provided with a resilient valve element 66, normally seating against the forward end of the plug 63. Around the valve element 66 is formed a chamber 68 communicating with an axial passage 69 extending through the valve device 64. The rear end of the passage 69 normally communicates with a chamber 70 formed in the member 53, this member being cut away as at 71 to connect the chambers 58 and 70. The plug 63 is provided with a port 74 communicating with the passage 59. The valve 66, being normally closed, disconnects the chamber 68 from the port 74, but when the valve 66 is open, as described below, the chamber 68 is vented to the atmosphere through port 74 and passage 59.

Within the bore 39 of the piston is arranged a tubular member 76, spaced from the bore 39 to form a passage 77 communicating through a port 78 with a variable pressure chamber 79 formed in the casing portion 31 between the piston 36 and wall 32. Obviously, the chamber 79 communicates through port 78 and tubular member 76 with the chamber 68 which chamber is normally subject to super-atmospheric pressure as described below. The rear end of the tubular member 76 is flanged as at 80 and sealed with respect to the hub 62 as at 81. The flange 80 is biased forwardly and the valve device 64 is biased rearwardly by a spring 82.

A cylinder 85 is arranged within the ring 45. The cylinder 85 is provided with a forward wall 86, having an annular flange 87 fixed to the member 53 as at 88. The forward portion of the cylinder 85 is spaced from the member 53 and ring 45 as at 90. This space communicates with a port 91 connected to a suitable source of pressure on the motor vehicle. The space 90 communicates with the chamber 58 through a port 92. Within the cylinder 85 is formed a chamber 93 in which atmospheric pressure is maintained through a port 94, communicating with the atmospheric chamber 59.

The wall 86 is provided axially thereof with a hub 95 in which is slidable a stem 96 provided at its forward end with a head 97 forming a seat for the valve 65 and normally disengaged therefrom. A nut 98 cooperates with the head 97 to clamp in position the inner periphery of a diaphragm 99, the outer periphery of which is clamped between the flange 87 and the adjacent portion of the member 53. The diaphragm 99 separates the chamber 70 from a chamber 100 formed forwardly of the diaphragm. This chamber communicates through a passage 101 in the stem member 96 with the chamber 70. A ferrule 102 engages the diaphragm 99 and is urged forwardly by a spring 103 to tend to hold the diaphragm 99 in engagement with a shoulder 104 forming a part of the member 53.

A cylinder 105 is mounted for sliding movement in the cylinder 85 and is sealed with respect thereto as at 106. The cylinder 105 is provided with a rear wall 107, and the interior of the cylinder 105 forms a part of the atmospheric chamber 93. A relatively heavy spring 108 has its forward end engaging the wall 86 and its rear end engaging the wall 107 to tend to move the cylinder 105 rearwardly to the position shown in FIGURE 2.

Another cylinder 110 has threaded connection with the cylinder 85, and the threads of the member 85, at at least one side thereof, longitudinally grooved as at 111 to afford communication between the pressure space 90 and a chamber 112 formed between the cylinders 105 and 110. The ring 45 carries a seal 113 in which the cylinder 110 is slidable. The cylinder 110 is provided at its rear end with a wall 115 having a seal 116 slidably engaging the rear portion of a sleeve 117. The inside of the wall 107 is provided with a flange 118 having pressed engagement with the sleeve 117 to form in effect a unit therewith.

The hub 95 has a pressed fit with a rearwardly extending sleeve 119 annularly grooved as at 120 to receive a plurality of locking balls 121, when the parts are in the positions shown in FIGURE 3. These balls are arranged in openings 122 in the sleeve end 123 of a slidable member 124, and radially outwardly of the openings 122, the balls 121 normally project into an annular groove 125 formed in the sleeve 117. The balls 121 are normally positioned as shown in FIGURE 3.

The slidable member 124 has a bore 128 the forward end of which terminates in a shoulder 129. A head 130 is slidable in the bore 128 and is normally spaced from the shoulder 129 as at 131 (FIGURE 3) to provide a lost motion connection between the head 130 and slidable member 124. A stem 132 projects forwardly from the head 129 and normally engages the rear end of the stem 96 as shown in FIGURE 3. The push rod 16 is connected as at 133 to the head 130 as that movement of the brake pedal moves the head 130 within the limits of the lost motion 131 (FIGURE 3), whereby the stem 132 operates the valve mechanism for the motor 30. The lost motion 131 is taken up upon expansion of the spring 108 upon a failure of pressure in the source, thus resulting in the raising of the brake pedal 14 from the low solid line operating position in FIGURE 1 to the high foot-operable position shown in broken lines in FIGURE 1.

*Operation*

The parts of the mechanism 10 normally occupy the positions shown in FIGURE 3, while the brake pedal 14 normally occupies the solid line position in FIGURE 1 from which it is slightly movable, as will become apparent, to operate the valve mechanism for the motor 30. Pressure from the source is fed through port 91 and groove 111 to the chamber 112, while atmospheric pressure is present in the chamber 93, as stated above. Pressure in the chamber 112 thus maintains the cylinder 105 in the position shown in FIGURE 3 with the spring 108 compressed. The balls 121 will be positioned as shown in FIGURE 3.

Pressure from the source also is communicated through the space 90, through port 92 to chamber 58, and through cut-away 71 to the chamber 70. Pressure flows through passage 101 into chamber 100 to normally maintain pressure therein. Since the valve 65 is open, pressure fluid will be supplied through the passage 69 and tubular member 76, through passage 77 and port 78 to the chamber 79. Thus, the piston 36 will be pressure-balanced.

When the brake is to be applied, the operator need only slightly depress the pedal 14 from the solid line position in FIGURE 1. The pedal 14 pivots in the pin 13 to effect movement of the push rod 16 to the left in FIGURES 1 and 3. Referring to FIGURE 3, it will be apparent that the push rod 16 and head 130 are free to move to the left within the limits of the lost motion 131 without engaging the shoulder 129. Initial movement of the stem 132 moves the stem 96 (FIGURE 3), whereupon the head 97 will engage the valve 65. This action disconnects the pressure chamber 70 (FIGURE 2) from the passage 69, thus cutting off communication between the motor chamber 79 and the source of pressure. Slight further movement of the stem 96 will transmit movement to the valve device 64 to unseat the valve 66. The motor chamber 79 is always in communication with the chamber 68 through the means referred to above. Upon opening the valve 66, therefore, the chamber 68 and the motor chamber 79 will be vented to the atmosphere through port 74 and air passage 59.

The foregoing operations, therefore, cause a drop in pressure in the chamber 79, whereupon differential pressure will effect movement of the piston 36 to operate the master cylinder and displace fluid through ports 22 and 23 (FIGURE 1), then through lines 24 and 26 to the wheel cylinders 25 and 27. Thus the brakes will be operated, and the degree of such operation will depend upon differential pressures affecting the piston 36.

It will be apparent that before operation of the valve mechanism takes place, the chambers 70 and 100 will be in communication through the passage 101. Upon the closing of the valve 65, the chamber 100 will be cut off from the chamber 70 but will remain in communication with the motor chamber 79 through passage 69, etc.; therefore, pressure in the chamber 100, in any position of the valve elements, will be a duplication of that in the chamber 79. Accordingly, pressures will have been balanced on opposite sides of the diaphragm 99 prior to the valve operation, but as soon as the valve mechanism starts to exhaust air from the chamber 79, there will be a pressure drop in the chamber 100 in the initial operation of the brakes. Differential pressures in the chambers 70 and 100 will result in pressure acting to the right against the head 97, thus producing reaction against the brake pedal proportional to differential pressures affecting the motor piston 36. Thus the brake pedal is provided with initial "feel" reaction.

During initial energization of the motor, the spring 103 will have sufficient force to resist pressure in the chamber 70 higher than pressure in the chamber 100. If brake operation continues, differential pressures in the motor chambers 58 and 79, duplicated in the chambers 70 and 100 respectively, will reach a point where the spring 103 will be overcome and the ferrule 104 will move to the right to its limit of movement. Thereafter, the exposed areas of the diaphragm 99 will transmit reaction force to the member 98 to provide a second state of pedal reaction.

At any time during energization of the motor 30, when the desired degree of braking has been attained, the operator may very slightly release the brake pedal to back off slightly on the head 97. The spring 82 will then seat the valve 66, whereupon the valve elements 65 and 66 will assume lap positions, and no further energization of the motor will take place.

The brakes may be released by fully releasing the brake pedal 14. Under such conditions, the spring 82 will return the valve elements to their normal positions, and pressure acting on the head 97 will move it to open position relative to the valve element 65. The return spring 37 will move the piston 36 back to its normal position as shown in FIGURE 2.

It will be apparent that the member 53 and cylinders 85 and 105 will have remained stationary during the foregoing operations, the spring 108 remaining compressed as shown in FIGURE 3. As previously stated, the brake pedal normally occupies a low position relative to the toe board, and in the event of a failure of pressure in the source, it is desirable to raise the brake pedal to the broken line position in FIGURE 1 and to establish mechanical connection between the brake pedal and the master cylinder plunger. If pressure in the source should fail, there will be a drop in pressure in the chamber 112 to or substantially to atmospheric pressure. Under such conditions, the spring 108, acting on the end wall 107, will move the cylindrical member 105 to the position shown in FIGURE 2. Such operation moves the sleeve 117, and movement will be transmitted through the balls 121 to the slidable member 124. When the balls, moving with the members 117 and 124 reach the position relative to the sleeve 119 shown in FIGURE 2, the groove 125 will cam the balls 121 into the groove 120, thus locking the sleeve 119 and slidable member 124 together.

During the operation just described, movement of the slidable member 124 will cause it to take up the lost motion 131 (FIGURE 3) and thereafter transmit movement to the push rod 16 and pin 15 to swing the pedal 14 to the broken line position in FIGURE 1, which position constitutes the normal position for the foot-operation of the brakes.

If the brakes are then applied, force will be transmitted through the push rod 16, head 130, slidable member 124 and balls 121 to move the sleeve 119 to the left in FIGURE 2. This movement effects movement of the member 53 together with the cylindrical members 85 and 105, and the hub 62 will transmit movement to the piston 36 by foot power, thus moving the master cylinder plunger or plungers to operate the brakes.

It will be apparent that during normal power operation, the only work performed by the push rod 16 is the operation of the valve mechanism. During foot-power operation, however, the push rod 16 becomes a force transmitting member for operating the brakes by foot power. During such operation, the pedal 14 becomes a lever through which power is generated and the lever ratio will be substantially the same as for present conventional foot power operated brakes. The pedal is provided with the necessary travel for such operation, and it is much easier to apply the brakes by foot power than is true of conventional booster mechanisms since a greater lever ratio is provided for operating the brakes.

It is to be understood that the form of the invention shown and described is to be taken as a preferred example of the same and that various changes in the shape, size and arrangement of parts may be made as do not depart from the spirit of the invention or the scope of the appended claims.

I claim:

1. A fluid pressure motor mechanism comprising a casing, a pressure responsive unit therein having chambers at opposite sides thereof, an axially movable structure comprising a pair of members one of which forms with said pressure responsive unit one of said chambers, and engages said pressure responsive unit, a valve mechanism carried by said one member and connected to a pressure source and operable for establishing differential pressures in said chambers to move said pressure responsive unit, said members being mounted to telescope, said axially movable structure including a casing surrounding the other of said members and forming therewith a pressure chamber in fixed communication with said source, a spring between said members biasing said other member away from said one member and normally held compressed by pressure in said pressure chamber, a pedal having a first normal position in which it engages an element of said valve mechanism to operate the latter and from which position it is movable independently of said other member, and control means operable upon a failure of pressure in said source and consequently in said pressure chamber for releasing said spring to move said other member to raise said pedal to a second normal position and for establishing mechanical connection between said pedal and said movable structure whereby the latter will be moved by said pedal to effect movement of said pressure responsive unit.

2. A motor mechanism according to claim 1 provided with automatic means for locking said pedal relative to said other member to establish said mechanical connection when said pedal is raised to said second normal position.

3. A motor mechanism according to claim 1 in which said pedal is provided with a push-rod engaging said element of said valve mechanism, said control means having a locking element associated therewith for locking said push-rod relative to said other member when said spring is released.

4. A motor mechanism according to claim 1 wherein said pedal is provided with a push rod and a slidable member surrounding said push-rod, a sleeve normally within said slidable member engaging said one member, and means operable when said spring is released for establishing mechanical connection between said slidable member and said sleeve for transmitting movement from said push-rod to said sleeve and thence to said one member for effecting movement for said pressure responsive unit.

5. A motor mechanism according to claim 1 wherein said pedal is provided with a push-rod normally engaging said element of said valve and provided with a head, an axially movable element surrounding said head and having a shoulder normally spaced therefrom to provide lost motion within which said head is movable to normally operate said valve mechanism, locking means normally locking said other member to said axially movable element to move the latter when said spring is released to take up said lost motion and move said pedal to said second normal position, and means operable when said spring is released for transmitting movement from said axially movable element to said one member to operate said pressure responsive unit.

6. A motor mechanism according to claim 5 wherein said means for transmitting movement from said axially movable element to said one member comprises a sleeve slidable on said axially movable element, said locking means comprising balls movable to establish mechanical connection between said axially movable element and said sleeve when said spring is released.

7. A fluid pressure motor mechanism comprising a casing, a pressure responsive unit therein having chambers at opposite sides thereof, an axially movable structure comprising a pair of units one of which is formed of a pair of members fixed to each other and one of which has sealed sliding engagement in said casing, said pair of members forming with said pressure responsive unit one of said chambers, said one member of said pair having mechanical engagement with said pressure responsive unit, a valve mechanism within said pair of members connected to a pressure source and provided with an operating stem movable to establish differential pressures in said chambers, the other unit of said pair being slidable in the other member and forming therewith an internal chamber communicating with the atmosphere, a spring in said internal chamber tending to move said other unit away from said one unit, a casing forming a part of the other member of said pair and forming with said other unit a pressure chamber communicating with said source whereby said other unit is held by pressure in a position compressing said spring, a pedal having a valve operating element normally engaging said stem and having a first normal position from which it is movable to operate said valve mechanism, and control means operable upon a failure in pressure in said pressure chamber whereby said spring is released to move said pedal to a second higher normal position and for establishing mechanical connection between said pedal and said one unit for the pedal operation of said pressure responsive unit.

8. A motor mechanism according to claim 7 wherein said control means comprises an automatic locking device operable when said pedal reaches said second normal position.

9. A motor mechanism according to claim 7 wherein said valve operating element comprises a push-rod, an axially movable element slidably supporting said push-rod, and a sleeve within said axially movable element engaging said one unit, said control means comprising a locking device engageable between said axially movable element and said sleeve when said pedal is in said second normal position.

10. A motor mechanism according to claim 7 wherein said pedal is provided with a push-rod normally engaging said stem and provided with a head, an axially movable element surrounding said head and having a shoulder normally spaced therefrom to provide lost motion within the limits of which said head is movable to normally operate said valve mechanism, said control means comprising a locking device normally locking said other unit of said pair to said axially movable element to move the latter when said spring is released to take up said lost motion and move said pedal to said second normal position, and means operable when said spring is released for utilizing said locking device for transmitting movement from said axially movable element to said one member to operate said pressure responsive unit.

11. A motor mechanism according to claim 10 wherein said last named means comprises a sleeve within said axially movable element, said locking device comprising a plurality of balls, said axially movable element having openings in which said balls are arranged and said other unit of said pair having a groove normally engaged by said balls when said spring is compressed to transmit movement to said axially movable element when said spring is released, said groove, when said pedal reaches said second normal position, camming said balls into engagement with said sleeve to lock the latter relative to said axially movable element.

12. A fluid pressure motor mechanism comprising a casing, a pressure responsive unit therein forming with said casing a pressure chamber at one side of said pressure responsive unit, an axially movable unit having a first portion forming with said casing and with said pressure responsive unit a pressure chamber at the other side of said pressure responsive unit, said axially movable unit comprising an annular member forming with other portions of said axially movable unit a control chamber communicating with a source of pressure, said axially movable unit being provided with an atmospheric chamber within said annular member, a spring in said atmospheric chamber normally compressed by pressure in said control chamber, said annular member, upon a failure in pressure in said control chamber, moving under the expansive force of said spring into engagement with another portion of said axially movable unit to limit movement of said annular member when said spring is released, a valve mechanism carried by said axially movable unit and connected to said source and having an operating element movable to establish differential pressures in said pressure chambers to move said pressure responsive unit, a pedal having a first normal position and having a member connected thereto in engagement with said element of said valve mechanism when pressure is present in said control chamber, and means operable upon the releasing of said spring incident to a drop in pressure in said control chamber for moving said pedal to a second normal position and for establishing mechanical connection between said pedal and said first portion of said axially movable unit whereby said pedal bodily moves said axially movable unit, said first portion of said axially movable unit engaging said pressure responsive unit to effect movement thereof when said pedal is moved from said second normal position.

13. A motor mechanism according to claim 12 wherein said means for establishing said mechanical connection comprises a control member connected to said annular member and having mechanical connection with said pedal to move it to said second normal position when said spring is released.

14. A motor mechanism according to claim 12 wherein said means for establishing said mechanical connection comprises a control member connected to said annular member, an inner sleeve having mechanical engagement with said first portion of said axially movable unit, an outer sleeve surrounding said inner sleeve and having mechanical engagement with said pedal, and locking means carried by said outer sleeve and mechanically engaging said control member when said spring is compressed whereby the releasing of said spring will transmit movement from said control member to said outer sleeve to move said pedal to said second normal position, and for establishing mechanical connection between said outer sleeve and said inner sleeve when said annular member reaches said limit of movement when said spring is released.

15. A motor mechanism according to claim 14 wherein said locking means comprises a plurality of balls carried by said outer sleeve, said control member being internally grooved to receive said balls when said spring is compressed to impart movement to said outer sleeve when said spring is released, said inner sleeve having an annular groove into which said balls are cammed by said internal groove to fix said inner and outer sleeves to each other, when said annular member reaches said limit of movement.

References Cited in the file of this patent

UNITED STATES PATENTS

| | | |
|---|---|---|
| 2,706,020 | Freers et al. | Apr. 12, 1955 |
| 2,755,891 | Levell et al. | July 24, 1956 |
| 2,766,732 | Schultz | Oct. 16, 1956 |
| 2,910,147 | Fishtahler et al. | Oct. 27, 1959 |
| 2,959,011 | Randal | Nov. 8, 1960 |
| 2,976,849 | Stelzer | Mar. 28, 1961 |
| 2,980,066 | Stelzer et al. | Apr. 18, 1961 |
| 2,985,147 | Rockwell | May 23, 1961 |